United States Patent
Georgeau et al.

(10) Patent No.: US 7,317,051 B2
(45) Date of Patent: Jan. 8, 2008

(54) MOISTURE CURABLE SEALER AND ADHESIVE COMPOSITION

(75) Inventors: Philip C. Georgeau, Kalamazoo, MI (US); Jonathan H. Ballema, Ada, MI (US)

(73) Assignee: Chem Link, Kalamazoo, MI (US)

( * ) Notice: Subject to any disclaimer, the term of this patent is extended or adjusted under 35 U.S.C. 154(b) by 280 days.

(21) Appl. No.: 10/760,920

(22) Filed: Jan. 20, 2004

(65) Prior Publication Data
US 2005/0107499 A1    May 19, 2005

Related U.S. Application Data

(60) Provisional application No. 60/520,235, filed on Nov. 14, 2003.

(51) Int. Cl.
C08K 5/01 (2006.01)
C08G 18/06 (2006.01)

(52) U.S. Cl. .................................. 524/837; 524/59
(58) Field of Classification Search ............... 524/59, 524/837
See application file for complete search history.

(56) References Cited

U.S. PATENT DOCUMENTS

| | | | |
|---|---|---|---|
| 4,373,960 A * | 2/1983 | Ward, Jr. ............. | 106/241 |
| 4,474,852 A * | 10/1984 | Craig ................. | 428/403 |
| 4,507,437 A | 3/1985 | Kato et al. | |
| 4,539,359 A | 9/1985 | Kato et al. | |
| 4,578,417 A | 3/1986 | Furukawa et al. | |
| 4,894,426 A | 1/1990 | Baghdachi et al. | |
| 4,954,598 A | 9/1990 | Baghdachi et al. | |
| 5,097,053 A | 3/1992 | Baghdachi et al. | |
| 5,227,434 A * | 7/1993 | Katz ................. | 525/419 |
| 5,227,442 A | 7/1993 | Babu et al. | |
| 5,290,853 A | 3/1994 | Regan et al. | |
| 5,296,561 A | 3/1994 | Babu et al. | |
| 5,298,572 A | 3/1994 | Katz | |
| 5,319,008 A | 6/1994 | Janoski | |
| 5,319,044 A | 6/1994 | Jung et al. | |
| 5,319,050 A | 6/1994 | Kimura et al. | |
| 5,397,648 A | 3/1995 | Babu et al. | |
| 5,421,876 A * | 6/1995 | Janoski ............... | 106/278 |
| 5,760,155 A | 6/1998 | Mowrer et al. | |
| 5,767,197 A | 6/1998 | Fukatsu et al. | |
| 6,124,387 A | 9/2000 | Wang et al. | |
| 6,211,292 B1 | 4/2001 | St. Clair | |
| 6,258,878 B1 | 7/2001 | Bahadur et al. | |
| 6,271,305 B1 | 8/2001 | Rajalingam et al. | |
| 6,271,333 B1 | 8/2001 | Okuhira | |

(Continued)

FOREIGN PATENT DOCUMENTS

JP    08253709    10/1996

(Continued)

*Primary Examiner*—David W. Wu
*Assistant Examiner*—Satya Sastri
(74) *Attorney, Agent, or Firm*—Price, Heneveld, Cooper, DeWitt, Litton, LLP

(57) ABSTRACT

A low cost moisture curable sealer and adhesive composition containing a polymer having reactive silyl groups and a bituminous material and having many advantages over conventional moisture cure sealer compositions, including greater elastomeric properties, improved flexibility and pliability, lower durometer, faster and deeper cure, low temperature cure. The composition is also free of carcinogens such as coal tar, toxic isocyanates, and volatile solvents.

29 Claims, 2 Drawing Sheets

U.S. PATENT DOCUMENTS

| | | |
|---|---|---|
| 6,344,520 B1 | 2/2002 | Greene |
| 6,579,924 B2 * | 6/2003 | Georgeau et al. ........... 524/376 |
| 2002/0115770 A1 | 8/2002 | Georgeau et al. |

FOREIGN PATENT DOCUMENTS

| JP | 10279812 | 10/1998 |
|---|---|---|
| JP | 10279812 A * | 10/1998 |
| JP | 04161889 | 6/2004 |
| WO | WO 00/37534 | 6/2000 |
| WO | WO00/37534 A1 * | 6/2000 |
| WO | WO 0037534 A1 * | 6/2000 |

\* cited by examiner

MOISTURE CURABLE SEALER AND ADHESIVE COMPOSITION

CROSS-REFERENCE TO RELATED APPLICATION

This application claims priority under 35 U.S.C. § 119(e) on U.S. Provisional Application No. 60/520,235 entitled MOISTURE CURABLE SEALER AND ADHESIVE COMPOSITION, filed Nov. 14, 2003, by Philip C. Georgeau et al., the entire disclosure of which is incorporated herein by reference.

FIELD OF THE INVENTION

This invention relates to a moisture curable sealer composition that can be used for waterproofing construction surfaces, saturating felts in a cold process built-up roofing system, adhering modified bitumen roofing sheets, or fleece backed single ply roof membranes to roof decks and/or rigid roof insulation boards.

BACKGROUND OF THE INVENTION

Moisture curable sealer compositions are useful in a variety of applications where a waterproof seal is needed to prevent water from entering a joint or space between adjacent structural members. Examples of such applications include seals between roofing materials and parapet walls, highway and airport runway expansion joints, etc. Moisture curable sealer compositions can also be used for automotive body sealing and undercoating. Such compositions have also been employed for waterproofing various structures, such as concrete structures, and in a mastic or putty form for use in caulking and adhesive applications.

In most cases, it is desirable to rapidly achieve a deep and complete cure. This usually reduces the possibility of forming defects, such as cracks, in the cured composition or seal. In many cases, a rapid cure is also desired to expedite subsequent construction or fabrication operations which cannot be performed until the sealer composition has cured.

Various polymeric materials, especially polyurethanes, have been used extensively as coatings and sealants in construction, automotive, and other applications. However, a disadvantage with polyurethanes, silicones and other conventional moisture curing polymeric coatings and sealer compositions is that they cure slowly under ambient conditions and in cool weather. Polyurethanes and silicones require extensive exposure to atmospheric moisture and when installed between impermeable substrates cure poorly or not at all.

Due to their low cost, and inherent water resistance, bituminous materials have traditionally been used as a main component of roof coatings, foundation coatings, paving, joint sealants, paints, and other end uses. However, existing unreinforced bituminous materials tend to melt, flow, or crack during normal seasonal thermal expansion and contraction.

In the past, there have been several attempts to combine bituminous material with synthetic polymeric materials such as polyurethanes to make moisture curing compounds. However, these previous attempts have not been completely successful. In particular, the known combinations of synthetic polymeric materials and bituminous materials have not produced desirable synergistic qualities such as fast or deep cure. Coal tar has also been modified with urethanes and other synthetic polymers with similar limitations.

SUMMARY OF THE INVENTION

The present invention provides low cost moisture curable sealer and adhesive compositions having many advantages over conventional moisture cure sealer compositions. Advantages include greater elastomeric properties, improved flexibility and pliability, improved low temperature properties, and much greater impermeability to water. Of greater importance is the elimination of health risks associated with the use of other known moisture curable sealer compositions containing hazardous ingredients, such as isocyanates, aromatic solvents, and coal tar.

The improved composition of this invention includes a bituminous material and a polymer having reactive silyl groups that cure upon exposure to very small amounts of atmospheric moisture, by means of an alkoxy cure mechanism, at temperatures as low as 20° F. The alkoxy reactive compound is very safe and it may be sprayed or otherwise applied, even in a confined space, without special chemical respirators, or full body skin protection. The toxicity of isocyanate reactive compounds is well known, and in several European countries isocyanates are prohibited because of their potential employee exposure risks.

These and other features, advantages and objects of the present invention will be further understood and appreciated by those skilled in the art by reference to the following specification, claims and appended drawings.

DETAILED DESCRIPTION OF PREFERRED EMBODIMENTS

Figure 1:
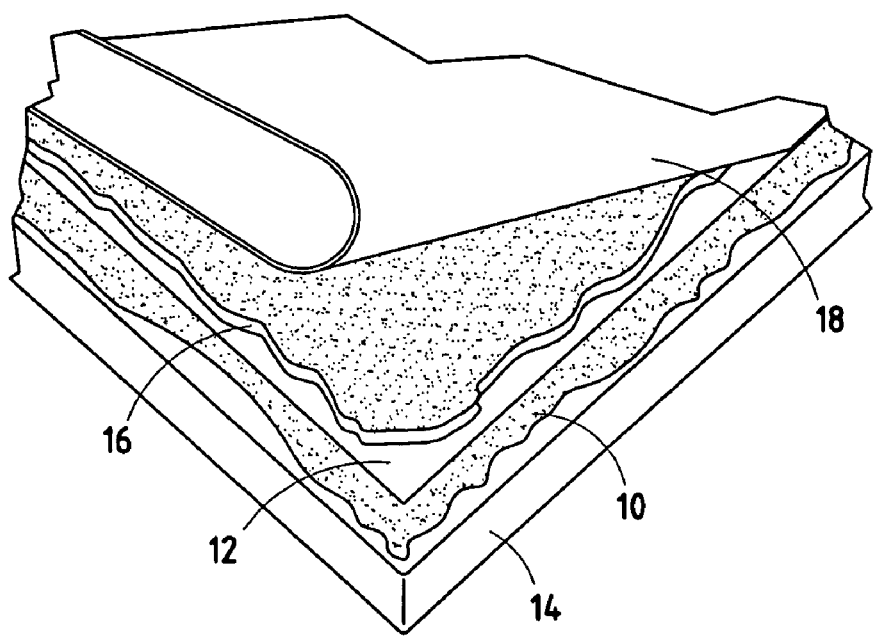
FIG. 1 is a perspective view of a modified bitumen roofing system assembly utilizing a moisture curable, solvent-free adhesive in accordance with the invention.

The compositions of this invention consist of, consist essentially of, or comprise a bituminous material, such as asphalt, and a silyl functional polymer. Preferred compositions also contain an organometalic catalyst, a plasticizer derived from soya oil, a hydrocarbon reinforcing resin, and fillers and/or extenders.

Examples of silyl-terminated polymers that may be used in the moisture curable compositions of this invention include silylated polyethers, silylated polyacrylates and silylated polyurethane prepolymers (SPUR). The silylated polymers or silyl-terminated polymers used in the moisture curable compositions of this invention include two or more reactive silyl groups, e.g., α, ω-telechelic silyl-terminated polymers.

An example of a suitable silyl-terminated polymer that may be used is an oxyalkylene polymer having at least one reactive silyl group at each end of the polymer molecule. The backbone of the silyl-terminated oxyalkylene polymer has repeating units represented by the formula: —R—O— wherein R represents a divalent organic group, preferably a straight or branched alkylene group containing 1 to 14 carbon atoms, and more preferably straight or branched alkylene groups containing 2 to 4 carbon atoms. Especially preferred are polypropylene oxide backbones, polyethylene oxide backbones, and copolyethylene oxide/polypropylene oxide backbones. Other repeating units may include, but are not limited to —$CH_2O$—, —$CH_2CH(CH_3)O$—, —$CH_2CH(C_2H_5)O$—, —$CH_2C(CH_3)_2O$—, —$CH_2CH_2CH_2CH_2O$— and the like.

The reactive silyl group contained in the silyl-terminated polymers may be represented by the formula: —$[Si(R^2)_{2-a}(X)_aO]_p$—$Si(R^3)_{3-b}(X)_b$ wherein $R^2$ and $R^3$ are the same or different and each represents an alkyl group containing 1 to 20 carbon atoms, an aryl groups containing 6 to 20 carbon atoms, an aralkyl group containing 7 to 20 carbon atoms or a triorganosiloxy group of the formula $(R^4)_3$ SiO— (wherein $R^4$ independently represents a hydrocarbon group containing 1 to 20 carbon atoms) and, when two or more $R^2$ and/or $R^3$ groups are present, they may be the same or different; X represents a hydrolyzable group or a hydroxyl group and, when two or more X groups are present, they may be the same or different; a represents an integer of 0 to 2; b represents an integer of 0 to 3; and p represents an integer of 0 to 19 and, when p is 2 or more, the —$[Si(R^2)_{2-a}(X)_aO]$ groups may be the same or different. In the reactive silyl group represented by the above general formula, there is at least one hydrolyzable group or hydroxyl group represented by X.

The above-mentioned alkyl group containing 1 to 20 carbon atoms includes, but is not limited to methyl, ethyl, isopropyl, butyl, t-butyl, cyclohexyl and the like.

The above-mentioned aryl group containing 6 to 20 carbon atoms includes, but is not limited to, phenyl, naphthyl and the like.

The above-mentioned aralkyl group containing 7 to 20 carbon atoms includes, but is not limited to, benzyl and the like.

The above-mentioned monovalent hydrocarbon group containing 1 to 20 carbon atoms includes, but is not limited to, methyl, ethyl, isopropyl, butyl, t-butyl, pentyl, ethynyl, 1-propenyl, vinyl, allyl, 1-methylbutyl, 2-ethylbutyl, phenyl and the like.

The above-mentioned hydrolyzable group represented by X is not limited to any particular species and includes a hydrogen atom, halogen atoms, and alkoxyl, acyloxy, ketoximate, amino, amido, acid amido, aminoxy, mercapto, alkenyloxy and the like groups. Among these, a hydrogen atom and alkoxyl, acyloxy, ketoximate, amino, amido, aminoxy, mercapto and alkenyloxy groups are preferred and, from the viewpoint of mild hydrolyzability and ease of handling, alkoxyl groups are particularly preferred.

One to three hydroxyl groups and/or hydrolyzable groups each represented by X may be bound to one silicon atom. The sum total of the hydroxyl and/or hydrolyzable groups in the reactive silyl group represented by the above general formula is preferably within the range of 1 to 5.

The number of silicon atoms forming the above-mentioned reactive silyl group may be 1 or 2 or more.

In the practice of the present invention, those reactive silyl groups which are represented by the general formula shown below are preferred because of their ready availability: —$Si(R^3)_{3-b}X_b$ wherein $R^3$, X and b are as defined above.

Methods of introducing a reactive silyl group onto a polymer, such as a polyether, or more specifically a polyoxyalkylene polymer, are well known in the art. For example, polymers having terminal hydroxyl, epoxy or isocyanate functional groups can be reacted with a compound having a reactive silyl group and a functional group capable of reacting with the hydroxyl, epoxy or isocyanate group.

As another example, silyl-terminated polyurethane polymers may be used. A suitable silyl-terminated polyurethane polymer may be prepared by reacting a hydroxyl-terminated polyether, such as a hydroxyl-terminated polyoxyalkylene, with a polyisocyanate compound, such as 4,4'-methylenebis-(phenylisocyanate), to form an isocyanate-terminated polymer, which can then be reacted with an aminosilane, such as aminopropyltrimethoxysilane, to form a silyl-terminated polyurethane.

Silyl-terminated polyesters are those having the reactive silyl groups discussed above with a backbone comprising —O—CO—$R^5$—CO—O—$R^6$— or —$R^7$—CO—O— repeat units, wherein $R^5$, $R^6$ and $R^7$ are divalent organic groups such as straight or branched alkylene groups.

The silyl-terminated polymers used in this invention may be straight-chained or branched, and typically have a weight average molecular weight of from about 500 to 50,000 Daltons, and more preferably from about 1,000 to about 30,000 Daltons.

Suitable silyl-terminated polyethers are commercially available from Kaneka Corporation under the names KANEKA MS POLYMER™ and KANEKA SILYL™, and from Union Carbide Specialty Chemicals Division under the name SILMOD™.

With conventional urethane compositions the cure requires one mole of water per mole of urethane linkages formed. Due to limitations on moisture diffusion, especially after the surface has cured (i.e., skinned over), deep cures take a very long time or do not occur at all with conventional urethane compositions. In contrast to the conventional urethane compositions, the moisture-curable polyesters, polyacrylates and polyurethanes used in the compositions of this invention release one mole of water for every mole of water used to achieve cure. Stated differently, water catalyzes curing of the compositions of this invention, but is not consumed during curing.

In addition to the silyl-terminated polymer, the moisture curable compositions of this invention include a bituminous material. Bituminous materials include bitumen, asphalt, performance-rated asphalt (oxidized asphalt) and Gilsonite bituminous resins.

The asphalt used may be straight run, blown, cracked and catalytically or non-catalytically polymerized asphalt, irrespective of their penetrations or softening points. Blown asphalts are normally produced in the presence or absence of catalyts by blowing asphalts or fluxes at elevated temperatures with an oxygen-containing gas such as air. A typical blown asphalt may have a softening point in the range from about 10° C. to about 100° C. Aromatic asphalts may also be employed, but are not preferred because they may present a health hazard to workers. Aromatic asphalts comprise the bottoms products from the distillation of catalytically cracked gas, oil or naphtha.

Commercially available asphalts include those derived from residues produced by atmospheric and vacuum distillation of crude petroleum; oxidation or air blowing of asphalts derived from the residues produced during distillation of crude petroleum; deasphalting of petroleum residues of lubricating oils of asphalt origin; blending hard propane asphalts with resins and oils to produce the socalled "reconstituted asphalts." Suitable asphalts include those having a rating of 60 Pen to 500 Pen (penetration).

In general, the more highly oxidized (blown) asphalts are preferred if greater hardness is desired, whereas the less oxidized asphalts are desired if greater flexibility and pliability are desired.

In general, it is preferred that the asphalts have relatively few reactive sites, such as hydroxyl groups, and that the asphalt be essentially anhydrous (dry). Further, it is desirable that the asphalt is substantially free of heterocyclic compounds or other compounds having reactive sites which will react with the functional groups on the silyl-terminated polymer.

In order to facilitate miscibility between the silyl-terminated polymer and the bituminous material, it may be desirable or necessary to incorporate a compatibilizer or plasticizer that wets and helps disperse the asphalt or other bituminous material in the silyl-terminated polymer. Suitable compatibilizers have a substantially non-polar terminal portion and a substantially polar terminal portion. Examples include esters of a polyol (i.e., a molecule having at least two hydroxyl groups, e.g., a diol, triol, etc.) and a $C_9$-$C_{24}$ fatty acid; the condensation product of a polycarboxylic acid and a $C_9$-$C_{24}$ acyclic alkanol; an ester of a $C_{10}$-$C_{15}$, polyarylene polyester polyol such as recycled polyethylene terephthalate (PET) polyol with a $C_9$-$C_{24}$ fatty acid; an ester of a polyether diol derived from a polyalkadiene diol and $C_2$-$C_{24}$ fatty acid; an ester derived from polymethylsiloxane diol and a $C_2$-$C_{24}$ fatty acid; and a polyester polyol having a repeating unit derived from acrylic or methacrylic acid and a polyol selected from the group consisting of $C_2$-$C_{12}$ alkylene diol or triol, a polyalkylene diol, or a polyoxyalkylene diol.

The compatibilizer may be employed in an amount from about 0.01 part to about 15 parts by weight based on 100 parts by weight of the moisture curable composition. Because the choice of an optimal compatibilizer and its concentration typically depends on the particular silyl-terminated polymer and asphalt employed, such choice can be made, and the concentration determined, using ordinary skill and routine experimentation.

The compositions of this invention may be formulated as a one-part moisture curable, pourable sealer composition. Such compositions desirably contain a silanol condensation catalyst for promoting fast reaction among the reactive silyl groups contained in the silyl-terminated polymers. Examples of silanol condensation catalyst include, but are not limited to, titanate esters such as tetrabutyl titanate and tetrapropyl titanate; organotin compounds such as dibutyltin dilaurate, dibutyltin maleate, dibutyltin diacetate, stannous octylate, stannous naphthenate, reaction products from dibutyltin oxide and phthalate esters, and dibutyltin diacetylacetonate; organoaluminum compounds such a aluminum trisacetylacetonate, aluminum tris(ethylacetoacetate) and diisopropoxyaluminum ethyl acetoacetate; reaction products from bismuth salts and organic carboxylic acids, such as bismuth tris(2-ethylhexonate) and bismuth tris(neodecanoate); chelate compounds such as zirconium tetraacetylacetonate and titanium tetraacetylacetonate; organolead compounds such as lead octylate; organovanadium compounds; amine compounds such as butylamine, octylamine, dibutylamine, monoethanolamine, diethanolamine, triethanolamine, diethylenetriamine, triethylenetetramine, oleylamine, cyclohexylamine, benzylamine, diethylaminopropylamine, xylylenediamine, triethylenediamine, guanidine, diphenylguanidine, 2,4,6-tris(dimethylaminomethyl)phenol, morpholine, N-methylmorpholine, 2-ethyl-4-methylimidazole and 1,8-diazabicyclo (5.4.0)undecene-7 (DBU); salts of said amine compounds with carboxylic or other acids; low-molecular-weight polyamide resins derived from excess polyamines and polybasic acids; and reaction products from excess polyamines and epoxy compounds. These may be used individually or in combination.

Among the silanol condensation catalysts mentioned above, organometallic compounds are preferred. The silanol condensation catalyst may be used in an amount of from about 0.01 to about 20 parts by weight per 100 parts by weight of the silyl-terminated polymer, with a more preferred addition level being from about 0.1 to about 10 parts by weight per 100 parts by weight of the silyl-terminated polymer.

In the curable compositions of the present invention, there may further be added, when necessary, various additives such as dehydrating agents, tackifiers, physical property modifiers, storage stability improving agents, fillers, antioxidants, adhesion promoters, ultraviolet absorbers, metal deactivators, antiozonants, light stabilizers, amine type radical chain inhibitors, phosphorus-containing peroxide decomposers, lubricants, pigments, anti-foaming agents, flame retardants and antistatic agents, each in an adequate amount.

The fillers mentioned above include, but are not limited to, wood meal, walnut shell flour, rice hull flour, pulp, cotton chips, mica, graphite, diatomaceous earth, china clay, kaoline, clay, talc, fumed silica, precipitated silica, silicic anhydride, quartz powder, glass beads, calcium carbonate, magnesium carbonate, titanium oxide, carbon black, glass balloons, aluminum powder, zinc powder, asbestos, glass fiber, fly ash and carbon fiber. The above fillers may be used individually or in combination.

The moisture curable compositions of this invention may contain from about 10 to about 175 parts by weight of bituminous material per 100 parts by weight of silyl-terminated polymer, with a more preferred range being from about 75 to about 150 parts by weight of bituminous material per 100 parts by weight of silyl-terminated polymer.

Preferably, the compositions of this invention are formulated without volatile organic solvents, and/or comprise, consist of, or consist essentially of one or more silyl-terminated polymers, and one or more bituminous materials. Optional additives that do not adversely affect and may enhance the essential characteristics and features of the invention include fillers, a compatibilizer that enhances miscibility between the silyl-terminated polymer and the bituminous material, optionally a catalyst that promotes moisture curing, and conventional amounts of conventional additives, such as dehydrating agents, compatibilizers, tactifiers, physical property modifiers, storage stability improving agents, antioxidants, adhesion promoters, ultraviolet absorbers, metal deactivators, antiozonants, light stabilizers, amine type radical chain inhibitors, phosphorous-containing peroxide decomposers, lubricants, pigments, foaming agents, flame retardants and antistatic agents.

The compositions of this invention may be formulated as paint or coating compositions by utilizing little, if any, fillers and/or other thixatropic agents. Alternatively, relatively thick pastes or compositions having a consistency or viscosity anywhere between a coating composition or a relatively thick paste may be achieved by adding suitable amounts of fillers and/or other thixatropic agents.

In general, the compositions of this invention have several advantages over conventional sealer compositions including conventional asphaltic/urethane compositions. There advantageous include lower costs, greater elastomeric properties, improved flexibility and pliability, and lower durometer (e.g., a Shore A of about 20 versus 30-40 for most conventional sealants.

An adhesive composition of this invention may be advantageously employed as a layer or film 10 for adhering a base sheet 12 of roofing materials, such as a polymer modified bitumen membrane (as shown in FIG. 1) to a roof deck 14. A second layer or film 16 of the adhesive composition may be employed to adhere a cap sheet 18 to the base sheet 12.

Figure 2:
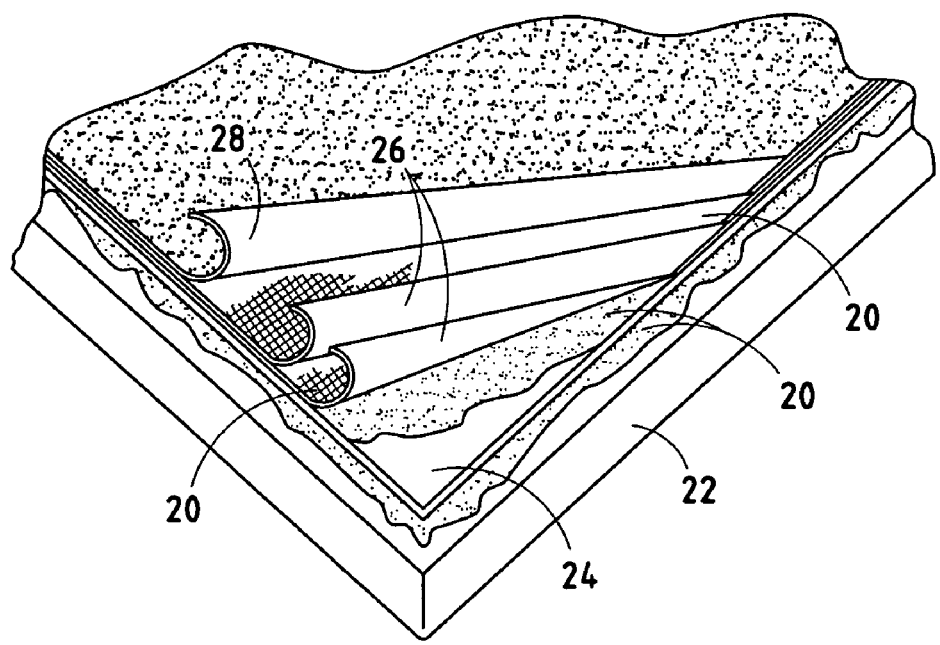
FIG. 2 is perspective view of an asphalt built-up roofing system assembled with a moisture curable adhesive in accordance with the invention.

A cold process built-up roofing system (as shown in FIG. 2) can also be constructed with a composition of this invention, replacing dangerous molten asphalt and solvent based asphalt adhesives with a safe solvent free, moisture curable adhesive. The built-up roofing system shown in FIG. 2 includes a base layer or film 20 of adhesive disposed between a roof deck 22 and a fiberglass base sheet 24. Additional alternating layers of adhesive 20 and fiberglass sheet 24 may be added as desired. The structure may be completed by adhering a granulated asphalt cap sheet 28 to the last sheet 26. The resulting thermosetting moisture cure multi ply composite forms a highly elastomeric roof system capable of accommodating substantial building movement and substrate expansion and contraction at high and low temperatures. Because of the superior waterproof and water vapor barrier properties of the compositions of this invention, water accumulated across the roof surface would not gain entry to the dry insulation and deck structure beneath the built-up waterproof composite.

Figure 3:
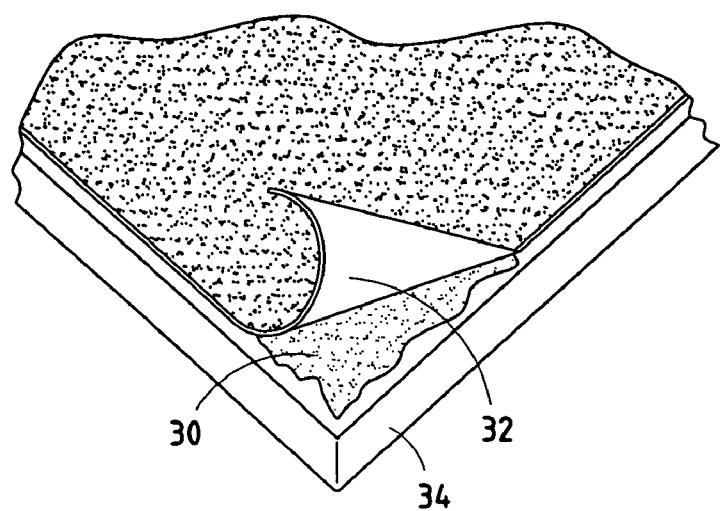
FIG. 3 is perspective view of a single-ply fleece-backed roofing system assembly utilizing a solvent-free moisture curable adhesive composition in accordance with the invention.

The compositions of this invention may also be advantageously employed as a layer or film 30 for adhering fleece backed single ply rubber membranes such as EPDM membranes 32, or the like (e.g., butyl rubber, polyisobutylene (PIB) thermoplastic olefin (TPO), polyvinyl chloride (PVC)) to an insulation board or a rigid concrete roof deck structure 34 (as shown in FIG. 3).

Figure 4:
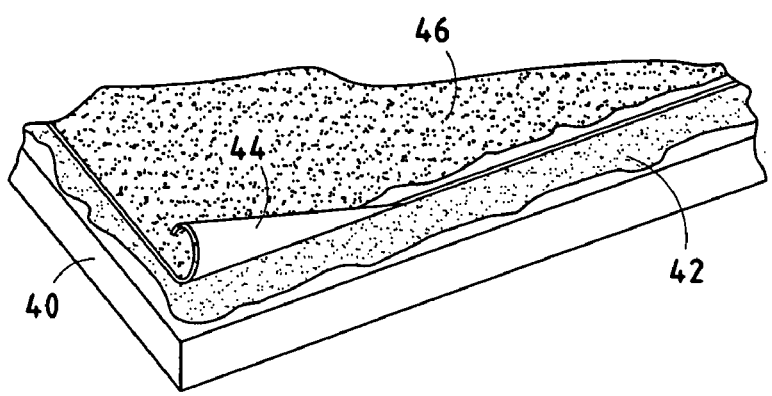
FIG. 4 is perspective view of a two-coat waterproofing structure utilizing a reinforcement fabric in combination with a waterproof adhesive/coating composition in accordance with the invention.

As shown in FIG. 4, an adhesive composition in accordance with the invention may be applied to a roof deck 40 to form a thin layer or coating 42 for adhering a reinforcement fabric 44 (e.g., a polyester fiber reinforced fabric) and a top coat of the waterproof compositions of this invention may be applied over reinforcement fabric 44 in a thin layer or film 46 to form a membrane in a two-coat roof waterproofing structure.

Figure 5:
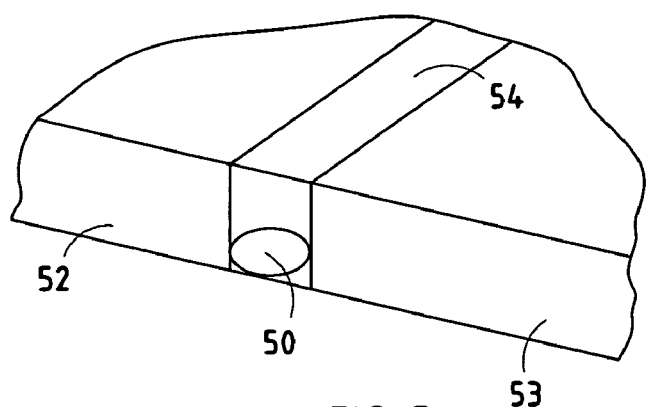
FIG. 5 is a perspective view of a horizontal joint seal in a concrete paving utilizing a joint sealer composition in accordance with the invention.

As shown in FIG. 5, a joint sealer composition in accordance with the invention may be utilized to prepare a horizontal joint seal in a concrete paving. As shown in FIG. 5, a backer rod 50 (typically made of a material that does not bond well to the sealer composition (e.g. polyethylene)) is disposed in the gap between adjacent concrete slabs 52 and 53 to prevent the sealer composition from penetrating into the ground, and thereafter sealer composition 54 is deposited into the remaining space between slabs 52 and 53 over backer rod 50 to form a horizontal joint seal in a concrete paving. As illustrated, sealer 54 completely fills the space between slabs 52 and 53 so that the top surface of the cured joint seal is flush with the top of the concrete slabs.

Low viscosity compositions of this invention may be used alone as a waterproof coating, or as a multi-ply composite layered in succession with reinforcing fabrics composed of fiberglass or polyester filaments. Such elastomeric composites would be used for waterproofing underground structures where substrate movement and hydrostatic pressure is encountered.

The compositions of this invention may also be formulated at a higher viscosity, for use as a sealing compound in expansion joints for highways and airport runways and parking structures. This is a particularly promising application in view of the materials excellent waterproof properties, adhesion, and elastomeric properties. The compositions of this invention may also be formulated for various other waterproofing, caulking, and sealing applications, including various automotive, building and construction applications.

EXAMPLE 1

The following example of a one-part moisture curable, waterproof coating composition illustrates the invention in further detail, but does not limit the scope of the invention. The illustrative composition includes the following ingredients in the amounts indicated:

| | |
|---|---|
| Asphalt - Trumble 4004 | 20.5% |
| Pyrolin - C9 hydrobarbon resin | 5% |
| Methyl Soyate Plasticizer | 7.3% |
| Silyl-terminated Polyacrylate - (Kaneka MAX-601) | 20.0% |
| Calcium Carbonate - (Huber Q-3) | 45.5% |
| Fumed Silica - (Cabot M-5) | 0.4% |
| Dehydrating Agent - (WITCO A-171 vinyl silane) | 0.7% |
| Adhesion Promoter - (WITCO A-1120 amino silane coupling agent) | 0.5% |
| Organo Tin Catalyst - (FOAMREZ SUL-11A) | 0.5% |

The above composition forms a skin within about 30 minutes and cures to a waterproof 30 mil film thickness within about two hours at room temperature. This compares very favorably with other commercially available urethane/asphalt moisture cure waterproofing compositions which form a skin in about one to two days and cure to a 30 mil film thickness in about two to three days at room temperature. Also, the above composition may be applied at lower temperatures than the commercially available urethane/asphalt blend. The illustrative example of the invention can be applied at temperatures as low as about 30° F., whereas application of the commercially available urethane/asphalt waterproofing composition is limited to a temperature of 40° F. Also, the illustrative composition of this invention is safer to the environment and to workers using the compositions. The compositions of this invention achieve a water permeability rating of less than 0.1 (e.g., 0.04 for Example 1) when tested in accordance with ASTM E96. Comparable urethane/asphalt compounds, such as Sonneborn HLM 5000, only achieve water permeability ratings of 0.9. In particular, the illustrative composition does not contain any volatile organic solvents, and does not contain any isocyanate compounds, whereas the commercially available urethane/asphalt waterproofing composition contains from about 8 to about 20% volatile organic solvent and from about 10 to about 30% by weight isocyanate compounds. Also, the compositions of this invention do not foam upon application over moist concrete, whereas the commercially available urethane/asphalt waterproofing compositions do foam upon application over moist concrete.

EXAMPLE 2

The following example of a one-part moisture curable, adhesive composition illustrates the invention in further detail, but does not limit the scope of the invention. The illustrative composition includes the following ingredients in the amounts indicated:

| | |
|---|---|
| Asphalt - (Trumble 4004) | 22.49% |
| Hydrocarbon Resin - (Pyrolen 100) | 8.8% |
| Methyl Soyate plasticizer - (Colombia) | 16.63% |
| Crayvalac Super thixotrope - (Cray Valley) | 1.22% |
| Mistron Vapor Talc - (Cyprus Mines) | 4.89% |
| Filler - (Cenospheres) | 22.49% |
| Silyl Terminated Polyether - (Kaneka MS 303) | 22.49% |
| A 171 vinyl silane - (OSI) | 0.78% |
| A 1120 amino silane - (OSI) | 0.68% |
| Sul 11A catalyst - (OSI) | 0.49% |
| Di butyl tin dilaurate - catalyst - (Air Products) | 0.49% |

The adhesive described in the above composition can be applied with a brush or squeegee to sheet roofing substrates. A 20 mil application skins over in thirty minutes at 70° F. and in fifteen minutes at 90° F. The adhesive attains a complete cure in twenty-four hours in bonds composed of four foot wide, moisture impermeable, modified between roofing sheets.

The above description is considered that of the preferred embodiments only. Modifications of the invention will occur to those skilled in the art and to those who make or use the invention. Therefore, it is understood that the embodiments described above are merely for illustrative purposes and not intended to limit the scope of the invention, which is defined by the following claims as interpreted according to the principles of patent law, including the doctrine of equivalents.

The invention claimed is:

1. A moisture curable composition, comprising:
a polymer having reactive silyl groups; and an asphalt material, wherein the polymer having reactive silyl groups is a polyester having silyl groups, a polyether having reactive silyl groups, or a polyurethane having reactive silyl groups.

2. A moisture curable adhesive composition, comprising:
a polyurethane having reactive silyl groups; and an asphalt material.

3. A moisture curable composition, comprising:
a polymer having reactive silyl groups; and
an asphalt material, wherein the polymer having reactive silyl groups is an α, ω-telechelic silyl-terminated polymer.

4. The moisture curable composition of claim 3, wherein the polymer having reactive silyl groups is a polyacrylate having reactive silyl groups or a polyether having reactive silyl groups.

5. A moisture curable composition, comprising:
a polymer having reactive silyl groups; and
an asphalt material, wherein the polymer having reactive silyl groups is a silyl-terminated oxyalkylene polymer.

6. A moisture curable composition, comprising:
a polymer having reactive silyl groups;
an asphalt material; and
a compatibilizing plasticizer in an amount effective to wet and help disperse the asphalt material in the polymer having reactive silyl groups.

7. The moisture curable composition of claim 6, wherein the compatibilizing plasticizer is an ester of a polyol with a fatty acid, the condensation product of a polycarboxylic acid and an alkanol, or a polyester polyol having repeating units derived from acrylic or methacrylic acid and a polyol.

8. The moisture curable composition of claim 1, further comprising a catalyst for promoting fast reaction among the reactive silyl groups of the polymer having reactive silyl groups.

9. The moisture curable composition of claim 1, wherein the asphalt material is present in an amount of from about 20 to about 175 parts by weight per 100 parts by weight of the polymer having reactive silyl groups.

10. The moisture curable composition of claim 1, wherein the asphalt material is present in an amount of from about 75 to about 150 parts by weight per 100 parts by weight of the polymer having reactive silyl groups.

11. The moisture curable composition of claim 1, wherein the composition is substantially free of volatile organic compounds.

12. The moisture curable composition of claim 1, wherein the composition is substantially free of isocyanate groups.

13. A moisture curable composition consisting essentially of:
a polymer selected from the group consisting of polyesters having reactive silyl groups, polyethers having reactive silyl groups, and polyurethanes having reactive silyl groups;
an asphalt material;
a compatibilizer in an amount effective to wet and help disperse the asphalt material in the polymer having reactive silyl groups;
optionally, a catalyst for promoting fast reaction among the reactive silyl groups of the polymer having reactive silyl groups; and
optionally, one or more additives selected from the group consisting of dehydrating agents, tactifiers, physical property modifiers, storage stability improving agents, antioxidants, adhesion promoters, ultraviolet light absorbers, metal deactivators, antiozonants, light stabilizers, amine type radial chain inhibitors, phosphorous-containing peroxide decomposers, lubricants, pigments, foaming agents, flame retardants and antistatic agents.

14. The moisture curable composition of claim 13, wherein the polymer having reactive silyl groups is an α, ω-telechelic silyl-terminated polymer.

15. The moisture curable composition of claim 13, wherein the compatibilizer is an ester of a polyol with a fatty acid, the condensation product of a polycarboxylic acid and an alkanol, or a polyester polyol having repeating units derived from acrylic or methacrylic acid and a polyol.

16. The moisture curable composition of claim 13, wherein the asphalt material is present in an amount of from about 20 to about 175 parts by weight per 100 parts by weight of the polymer having reactive silyl groups.

17. The moisture curable composition of claim 13, wherein the asphalt material is present in an amount of from about 75 to about 150 parts by weight per 100 parts by weight of the polymer having reactive silyl groups.

18. The moisture curable composition of claim 13, wherein the composition is substantially free of volatile organic compounds.

19. The moisture curable composition of claim 13, wherein the composition is substantially free of isocyanate groups.

20. The moisture curable composition of claim 1, which has been applied to a substrate and cured to form a film having a water permeability rating less than 0.1.

21. The moisture curable composition of claim 1, that is free of volatile organic compounds.

22. A composite waterproofing system comprising:
a moisture curable composition of claim 1 disposed between or on at least one side of one or more sheets of reinforcement scrim.

23. A roof membrane system comprising:
at least two plies of a polymer modified bitumen membrane adhered to each other and to a roof structure by a moisture curable composition of claim 1.

24. A roofing system comprising:
a plurality of asphalt impregnated fiberglass felt layers adhered to each other and to a roof structure by a moisture curable composition of claim 1.

25. A highway, parking structure or airport runway, comprising:
a plurality of concrete slabs arranged proximately to each other and defining at least one gap between the slabs, and a moisture curable composition of claim 1 deposited in the gap to form a horizontal joint seal.

26. A solvent-free, moisture curable composition for waterproofing automotive body components or for automotive underbody coating, comprising:

"a polymer selected from the group consisting of polyesters having reactive silyl groups, polyethers having reactive silyl groups and polyurethanes having reactive silyl groups; and an asphalt material".

27. A roofing system comprising:

a fleece- or felt-backed polymer membrane adhered to a roof structure by a moisture curable composition of claim 1.

28. A concrete structure comprising:

a plurality of concrete slabs; and a moisture curable composition of claim 1 coated onto surfaces of the concrete slabs and/or deposited in gaps defined between adjacent slabs of the structure.

29. The moisture curable composition of claim 1, wherein the reactive silyl group is represented by the formula:

—$[Si(R^2)_{2-a}(X)_aO]_p$—$Si(R^3)_{3-b}(X)_b$ wherein $R^2$ and $R^3$ are the same or different and each represents an alkyl group containing 1 to 20 carbon atoms, an aryl groups containing 6 to 20 carbon atoms, an aralkyl group containing 7 to 20 carbon atoms or a triorganosiloxy group of the formula $(R^4)_3$SiO—, wherein $R^4$ independently represents a hydrocarbon group containing 1 to 20 carbon atoms, and, when two or more $R^2$ and/or $R^3$ groups are present, they may be the same or different; X represents a hydrolyzable group or a hydroxyl group and, when two or more X groups are present, they may be the same or different; a represents an integer of 0 to 2; b represents an integer of 0 to 3; and p represents an integer of 0 to 19 and, when p 2 or more, the —$[Si(R^2)_{2-a}(X)_aO]$groups may be the same or different, with the proviso that the reactive silyl group includes at least one hydrolyzable group or hydroxyl group represented by X.

* * * * *

UNITED STATES PATENT AND TRADEMARK OFFICE
CERTIFICATE OF CORRECTION

PATENT NO. : 7,317,051 B2  
APPLICATION NO. : 10/760920  
DATED : January 8, 2008  
INVENTOR(S) : Philip C. Georgeau et al.

Page 1 of 1

It is certified that error appears in the above-identified patent and that said Letters Patent is hereby corrected as shown below:

Column 2:  
Lines 33, 36, 39, Before "perspective" insert --a--.

Column 3:  
Line 15, "groups" should be --group--.

Column 4:  
Line 61, "socalled" should be --so-called--.

Column 5:  
Line 44, "a" should be --as--.

Column 6:  
Line 54, "There advantageous" should be --These advantages--.

Column 8:  
Line 2, "Pyrolin – C9 hydrobarbon" should be --Pyrolen® C9 hydrocarbon--.  
Line 52, "(Pyrolen 100)" should be --(Pyrolen® 100)--.

Column 10:  
Claim 13, line 19, "and" should be --or--.

Column 12:  
Claim 29, line 3, "groups" should be --group--.

Signed and Sealed this

Twenty-ninth Day of September, 2009

David J. Kappos  
*Director of the United States Patent and Trademark Office*